Aug. 17, 1948.　　　V. A. HOOVER　　　2,447,339
COOLING OF ELECTRIC MACHINES
Original Filed Nov. 6, 1943
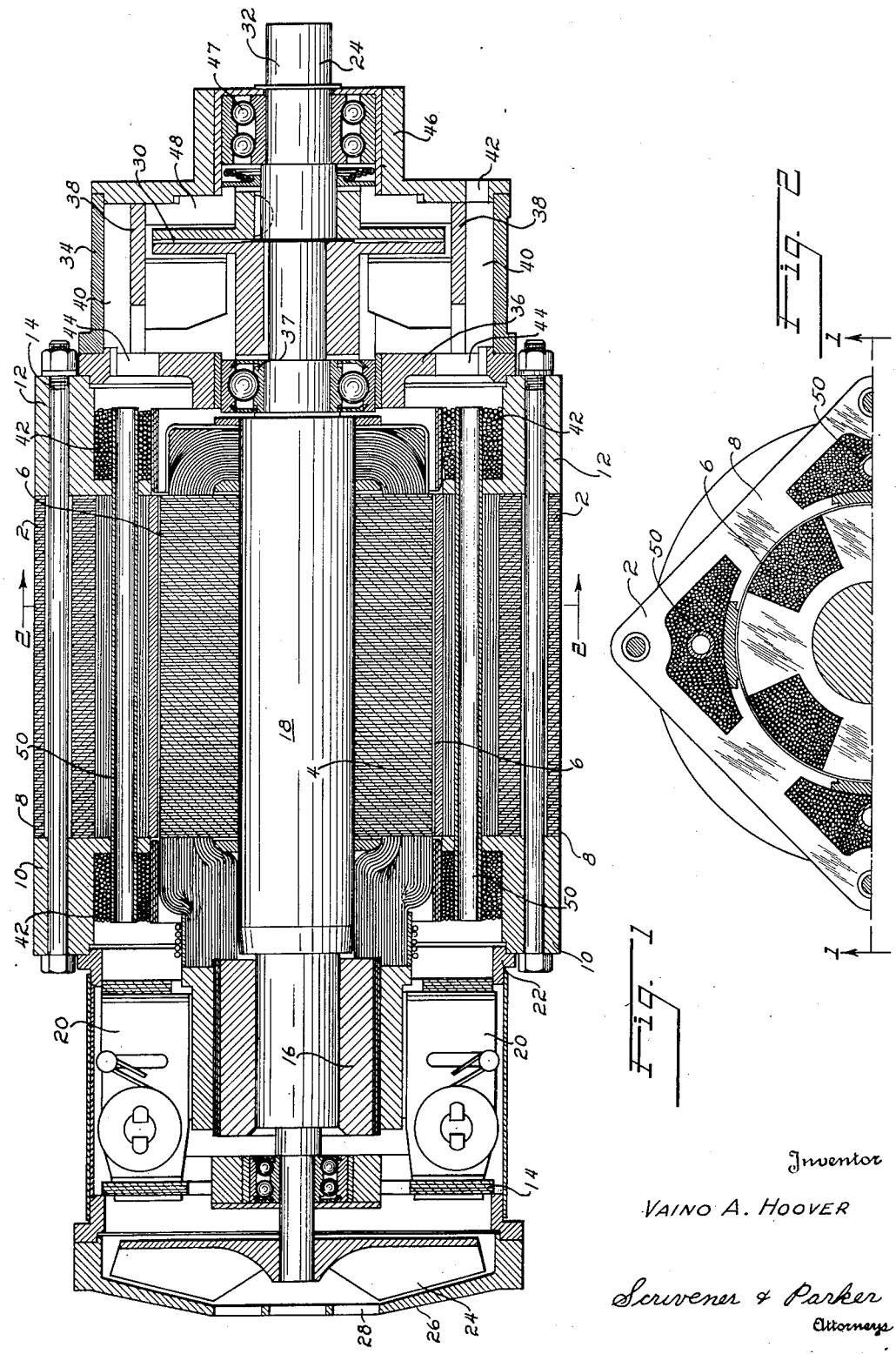
Inventor
VAINO A. HOOVER
Scrivener & Parker
Attorneys Patented Aug. 17, 1948

2,447,339

UNITED STATES PATENT OFFICE 2,447,339

COOLING OF ELECTRIC MACHINES

Vaino A. Hoover, Los Angeles, Calif., assignor to Electrical Engineering and Manufacturing Corporation, Los Angeles, Calif., a corporation of California Original application November 6, 1943, Serial No. 509,295. Divided and this application November 13, 1945, Serial No. 627,979

1 Claim. (Cl. 171—252)

This application is a division of my co-pending application Serial No. 509,295, filed November 6, 1943, now abandoned, for Cooling of electric machines.

This invention relates in general to electrical machines such as motors and generators and more particularly to the cooling of such machines.

It has been the principal object of this invention to provide means for effectively cooling an electrical machine without affecting the operating characteristics of the machine. Another object has been to provide a unitary, self-contained electric motor having a clutch and brake associated therewith and having common means for cooling both the motor and the clutch and brake.

Other objects and features of novelty of the invention will be made apparent by the following description and the attached drawings which, it will be understood, are only illustrative of the invention and impose no limitation thereon not imposed by the appended claim.

Referring to the drawings, in which similar reference numerals refer to like parts, Fig. 1 is a longitudinal sectional view of a motor and clutch assembly embodying cooling means according to the invention taken along line 1—1 of Figure 2, and Fig. 2 is a partial sectional view taken on the line 2—2 of Fig. 1.

In Figs. 1 and 2 of the drawing there is illustrated an electric motor formed according to my invention. This motor comprises a central part formed by a stator 2 and a rotor or armature 4 which is rotatably mounted within a central bore of the stator, there being an annular air gap 6 between these two parts. The stator is formed of a plurality of superposed laminations 8 which are attached together and to end rings 10, 12 by bolts 14. At one end of the motor a commutator 16 is mounted on the armature shaft 18 and is surrounded by brushes 20 which are supported by an end bell 22 which is connected to the stator by end ring 10. The outer end of the armature shaft at the commutator end of the motor carries a fan 24 which is of the central-intake, peripheral-discharge type. An end plate 26 closes the outer end of the motor and is provided with central openings 28 through which air is drawn by the fan. At the drive end of the motor there is provided a clutch 30, which is preferably of the type and construction disclosed and claimed in my co-pending application Serial No. 509,290, filed November 6, 1943, and by which a driven shaft 32 is adapted to be drivably connected to the armature shaft for rotation thereby. The drive end of the armature and the entire clutch assembly is enclosed by a drive end bell 34 between which and the end ring 12 there is provided a wall 36 which supports a bearing 37 for the drive end of the armature shaft. Between the wall 36 and the outer end wall of the drive end bell there is provided a cylindrical shell 38 which is of less radius than the cylindrical wall of the drive end bell whereby an annular chamber 40 is left between the two which communicates to atmosphere through openings 42 in the end wall of the drive end bell 34. This cylindrical shell tightly surrounds the fixed members of the clutch assembly as more fully described in my aforesaid co-pending application. Openings 44 are provided in the wall 36 whereby communication of air from the end ring 12 to space 40 and the atmosphere is provided. The outer end of the drive end bell is provided with a reduced diameter extension 46 which supports a bearing 47 for the driven shaft. A brake disc 48 is fixedly attached to the inner face of the outer end wall of the drive end bell and is normally engaged by the driven member of the clutch in order to hold the driven shaft from rotation.

Means in addition to those already described are provided by the invention for cooling the stator part of the motor and for causing the circulation of cooling air into and through all parts of the motor and clutch and brake assembly, by providing a flow of air through the stator and between the commutator end and the drive end of the motor. Such means comprise a plurality of tubes 50 which extend longitudinally through the stator windings and form air ducts extending from end to end thereof and which at their respective ends open into the commutator end bell and the drive end bell. The tubes 50 are forced among the wires 42, which form the stator winding, during the manufacture of the stator, and it is therefore important that the tubes be formed of a material of substantially the same strength as the insulating material of the wires, in order that there will be a minimum possibility of breaking of the wire insulation as the tube is forced into the stator winding. It is also important that the tubes be formed of insulating material as, if other material were used, a wire of the stator winding might become grounded on the tube and short-circuit the winding. The described parts provide means for constantly forcing cooling air over and into intimate contact with all parts of the motor and clutch and brake, to thereby cool all elements of the machine.

In the operation of the described machine the fan 24 draws cooling air through central openings 28 in end plate 26 and forces it axially toward the drive end of the machine. The cooling air passes through the commutator end bell 22 and over and around the brushes and commutator therein and from thence flows through the air gap 6 between the stator and armature and through the tubes 50 within the stator windings, passing from the air gap and tubes into the drive end bell and from there through openings 44 in wall 36, annular chamber 40 and openings 42 to atmosphere.

While I have described and illustrated one embodiment of my invention, it will be clear to those skilled in the art that other embodiments may be made as well as modifications of that disclosed, all without departing in any way from the spirit or scope of the invention, for the limits of which reference must be had to the appended claim.

What is claimed is:

An electrical machine comprising a fixed stator having windings and an axial bore, an armature rotatably mounted within the stator bore, an armature shaft extending from the ends of the armature, a commutator on one end of said shaft, brushes disposed about said commutator, driven means connected to the other end of the armature shaft, housing means for said commutator and brush means, housing means for said driven means, a fan mounted on the armature shaft within the commutator housing and adapted to direct cooling air in the direction of the driven end of the machine, and a plurality of tubes formed of insulating material extending through the stator windings and communicating with both said housing means through which cooling air is forced by said fan through the entire length of the machine, the tubes being made of electrically insulating material which has substantially the same mechanical strength as the insulating material of the wire of the stator winding.

VAINO A. HOOVER.

REFERENCES CITED

The following references are of record in the file of this patent:

UNITED STATES PATENTS

| Number | Name | Date |
|---|---|---|
| 923,673 | Lord | June 1, 1909 |
| 1,170,192 | Rudenburg | Feb. 1, 1916 |
| 1,784,102 | Lincoln | Dec. 9, 1930 |
| 2,301,156 | Behlen | Nov. 3, 1942 |

FOREIGN PATENTS

| Number | Country | Date |
|---|---|---|
| 109,516 | Austria | May 10, 1923 |
| 60,125 | Sweden | Jan. 19, 1926 |
| 106,317 | Switzerland | Aug. 16, 1924 |